United States Patent Office 2,721,397
Patented Oct. 25, 1955

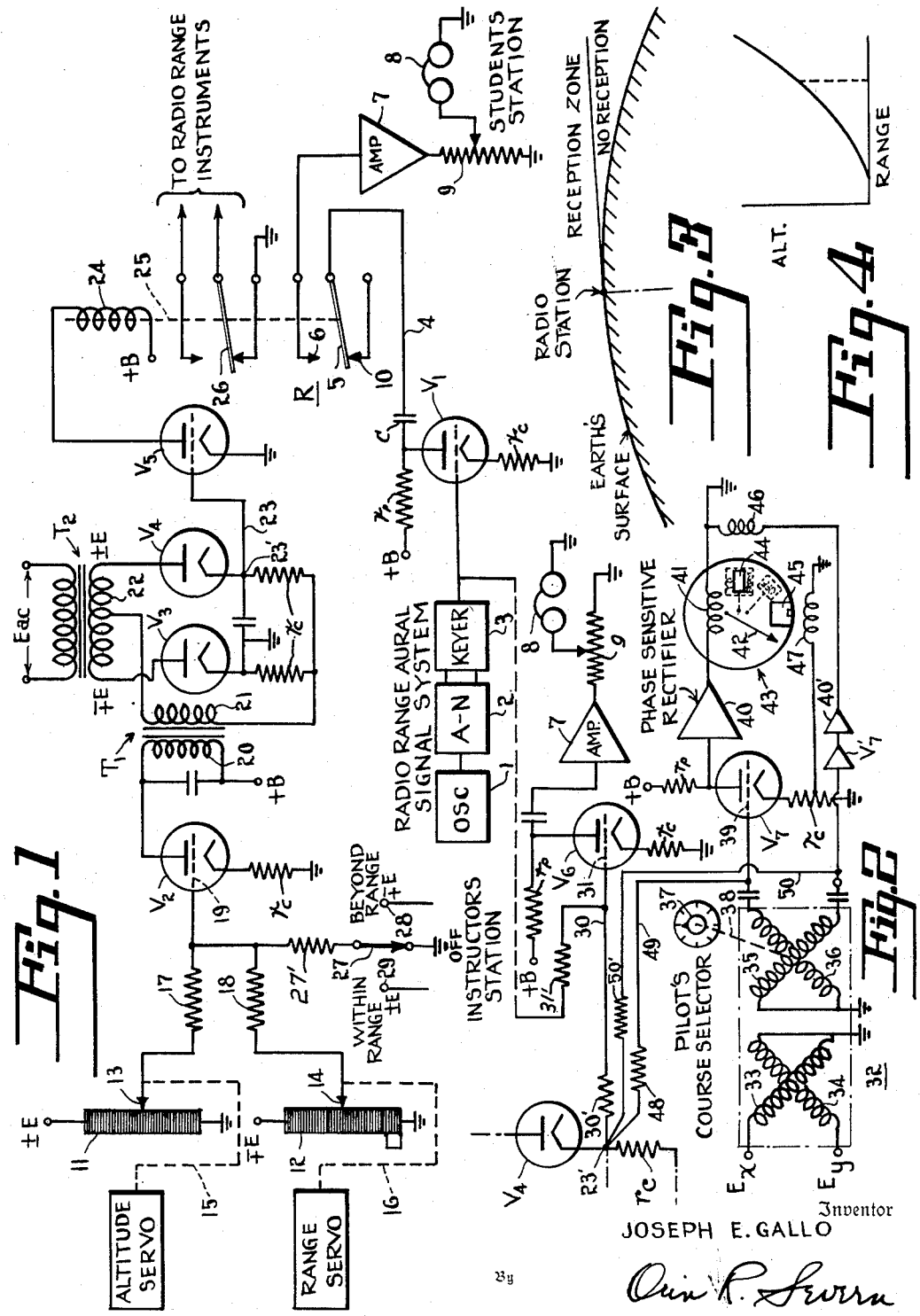

2,721,397

SIMULATED HIGH FREQUENCY RADIO RECEIVING APPARATUS FOR AIRCRAFT TRAINERS

Joseph E. Gallo, Livingston, N. J., assignor to Curtiss-Wright Corporation, a corporation of Delaware Application July 17, 1951, Serial No. 237,211

7 Claims. (Cl. 35—10.2)

This invention relates to means for simulating the reception of high frequency radio signals in an aircraft, and is useful in the ground training of aircraft personnel.

In practice, the reception of high frequency radio signals in an aircraft is in general limited by the earth's curvature so that radio reception with respect to the so-called "line-of-sight" depends upon the aircraft having sufficient altitude. As is well known, high frequency radio reception fades as the aircraft drops below the line-of-sight until no reception, except in unusual cases, is possible.

The principal object of this invention, therefore, is to provide in connection with grounded aircraft trainers, improved means for simulating high frequency radio reception that takes into account the instant position of the simulated flight with respect to the line-of-sight or demarcation zone, so that the radio signals may fade in or out according to the relative flight position as in actual practice.

A further object of this invention is to provide improved training means of the above character for simulating realistically both the aural and visual signal reception, including the operation of radio responsive navigation instruments, such as the localizer cross-pointer, for example.

This invention will be more fully set forth in the following description referring to the accompanying drawing, and the features of novelty which characterize this invention will be pointed out with particularity in the claims annexed to and forming a part of this specification.

Referring to the drawing, Fig. 1 is a circuit diagram of a simulated reception system for high frequency radio range signals embodying the present invention; Fig. 2 is a modified circuit diagram of a portion of the simulated reception system for combined signal reception, both aural and visual; and Figs. 3 and 4 are diagrams illustrating the effect of the earth's curvature on high frequency radio reception.

Referring to Fig. 1, there is indicated a radio range aural signal system including an oscillator 1 for generating a voltage of the desired frequency, an A—N or quadrant divider 2 and a keyer 3 for coding the range signals in the usual manner. This part of the system per se forms no part of the present invention, and may be of any suitable type, such as that disclosed in Dehmel Patent No. 2,366,603, granted January 2, 1945 for "Aircraft Training Apparatus." The signal from the keyer 3 is fed to the control grid of an electronic valve $V_1$ having conventional plate load and cathode resistances $r_p$ and $r_c$ respectively. Corresponding resistances associated with other tubes are similarly indicated. The plate signal circuit 4 of the valve is adapted to be connected through the usual isolating condenser C and contacts 5 and 6 of a relay R to the input of an amplifier 7, the output circuit of which includes the student's headphones 8 and a variable resistance 9 for adjusting signal volume at the student's station. The plate circuit of valve $V_1$ is energized by a D. C. voltage herein indicated +B. The aural signal system so far described is conventional except for the function of the relay R, the operation of which will now be described.

The operation of the relay R is controlled in accordance with simulated aircraft altitude and simulated range or distance of the aircraft from the high frequency radio transmitting station so as either to connect in circuit the output of valve $V_1$ and the student's amplifier and headphones to simulate normal reception, or to open the aforesaid valve output circuit at the dead contact position 10, thereby simulating a dead zone of reception. To this end, a pair of potentiomers 11 and 12 are suitably adjusted by means representing aircraft altitude and range respectively for deriving voltages at the slider contacts 13 and 14 representing respectively values of the aforesaid altitude and range. The altitude and range adjusting means may for example be in a flight computing system of the type disclosed in the aforesaid Dehmel Patent No. 2,366,603, and comprises servo units or the like mechanically connected as indicated at 15 and 16 to the respective potentiometer contacts. The contacts 13 and 14 are connected through proportioning resistances 17 and 18 to the control grid 19 of an amplifier valve $V_2$.

The potentiometers 11 and 12 are energized by oppositely phased A. C. voltages having instant polarities as indicated and one of the potentiometers, such as the range potentiometer 12, may be wound (or contoured) to have its resistance vary according to the relationship between altitude and range as graphically illustrated by Fig. 4. In order to represent the initial range within which signal reception is possible at minimum altitude, a predetermined section of the ground end of the potentiometer may be shorted.

From the foregoing, it will be seen that voltages of opposite phase energize the grid of valve $V_2$, the phase of the resultant voltage being determined by the relative settings of the potentiometers. Thus, when the altitude voltage is greater than the range voltage, the instant polarity at the grid 19 is positive, and vice versa. When the two voltages are equal no voltage appears at the grid 19 and the relationship corresponds to a flight position along the line-of-sight separating the reception and non-reception zones with respect to the earth's surface as graphically illustrated in Fig. 3. When the range voltage exceeds the altitude voltage, the voltage on grid of valve $V_2$ is phased so as to represent the zone of no reception and the output of the valve is fed to a phase sensitive rectifier for producing an appropriate control voltage.

Specifically, the plate circuit of valve $V_2$ is connected to the primary winding 20 of a transformer $T_1$, the secondary winding 21 of which is connected to a phase sensitive rectifier circuit including a transformer $T_2$ and a pair of rectifiers $V_3$ and $V_4$. The plate circuits of these rectifiers are connected in conventional manner to the aforesaid secondary winding 21 through the mid tap of the secondary winding 22 of transformer $T_2$. The primary of this transformer is energized by a reference A. C. voltage $E_{ac}$ that is polarized as indicated at the secondary terminals. The cathode circuits are connected in common to the opposite terminal of the secondary winding 21 and to the rectifier output conductor 23 at junction 23'. The rectifier output is connected to the control grid of the amplifier valve $V_5$, the output circuit of which includes the energizing winding 24 of the relay R. As shown, the phase of the induced voltage in the secondary of $T_1$ corresponds with that of the voltage at the grid of $V_2$. The phase relationships are arbitrarily selected with respect to the reference voltage $E_{ac}$ so that when the instant polarity at the grid of valve $V_2$ is negative, the polarity of the rectifier D. C. voltage at junction 23' is also negative, thus causing cut-off of the relay valve $V_5$, and vice versa. The relay is mechanically connected as indicated at 25 to the contact 5 for operating the same in the manner previously referred to, and also to a contact 26 for suitably controlling or disabling simulated radio range instruments.

Thus, it is clear that the operation of relay R is in accordance with the output of valve V₂, the relay winding being energized according to positive voltage at junction 23' when the instant polarity of the voltage at the grid of valve V₂ is positive, thus representing sufficient altitude for reception. This relay operation elevates the contacts 5 and 26 for connecting the aural signal system and radio range instruments in circuit for normal operation. The relay winding is de-energized according to negative voltage at junction 23' in response to instant negative polarity at the grid of valve V₂ (representing excessive range) and cut-off of the current at valve V₅ so as to open the relay contacts and disable the aural and visual signal systems.

The instructor's station is provided with a switch 27 that is connected to the grid 19 through a proportioning resistance 27' and operable by the instructor to represent unusual reception conditions often encountered in actual practice. For representing a condition wherein the aircraft position is beyond the range of the transmitting station, the switch is thrown to contact 28 which is energized by an A. C. voltage corresponding in phase to that impressed on the range potentiometer 12; and for representing an aircraft position within the range of the station, the switch is thrown to contact 29 which is energized by an A. C. voltage corresponding in phase to that of the altitude potentiometer 11. Normally the switch is grounded as shown. Thus, the instructor can introduce unusual conditions during a navigation training problem.

Referring to Fig. 2, there is shown a modified arrangement wherein gradual control of the signal system is used in lieu of "on-off" control by the relay R of Fig. 1. Fig. 2 also illustrates an example of how the invention is applied to visual signal means or instruments, such as the localizer cross-pointer. As in Fig. 1, the system of Fig. 2 takes the control voltage from the phase sensitive rectifier circuit as represented by the valve V₄ and junction 23'. In the case of the aural signal system, the rectified voltage is led from junction 23' by way of the circuit 30 including a proportioning resistance 30' to the control grid 31 of valve V₆. The control grid of this valve has impressed thereon the signal voltage from the aural signal system indicated in Fig. 1 through a circuit including a proportioning resistance 31'. The plate signal circuit of the valve V₆ is connected to the amplifier 7 for energizing the student's headphones 8 in the manner above described. Since the signal potential at the grid of valve V₆ may be modified by the voltage from the rectifier circuit, particularly in the case where a negative D. C. voltage is produced by the rectifier circuit at junction 23' tending to reduce, and finally cut off the output of valve V₆, it will be apparent that the signal volume at the headphones 8 decreases in accordance with the increase of negative voltage from the rectifier circuit so as to simulate the gradual fading of the signals as the aircraft position drops below the line-of-sight.

The simulation of instrument operation follows the same principle described in connection with the aural signals. In the case of the simulated localizer cross-pointer instrument 43, for example, the normal operation of the instrument is in response to a voltage derived from a voltage resolver or rotary transformer 32 that is adjustable to represent the pilot's course selector. The resolver 32 may be of the type shown in Dehmel Patent No. 2,510,384 granted June 6, 1950 for "Coordinate Conversion and Vector Apparatus" and comprises a pair of fixed primary windings 33 and 34 connected in quadrature as indicated and energized respectively by A. C. voltages $E_x$ and $E_y$ representing the instant position of the aircraft in a Cartesian reference co-ordinate system. Means for deriving voltages of this character is disclosed in Dehmel Patent No. 2,475,314 granted July 5, 1949 for "Navigation Apparatus for Aircraft and Training Devices." The secondary windings 35 and 36 are likewise connected in quadrature and are rotatable as a unit by means of the pilot's adjusting dial 37 that is suitably connected as indicated at 38 to the transformer secondary. The voltages induced in the secondary windings, depending on the course selected by the pilot may represent (in the case of winding 36) the deviation of the aircraft position from the aforesaid course, and (in the case of winding 35) the range of the aircraft with respect to the station. Since this range voltage reverses in phase when the station is passed and range beyond the station is indicated, this reversal of phase can be used for representing the "ambiguity" condition, i. e. the "to" and "from" signal with respect to the station.

Specifically, the winding 36 is connected through an isolating condenser as indicated to the control grid 39 of valve V₇, and the output of the valve energizes a phase sensitive rectifier 40 that in turn is connected to the coil 41 of the localizer cross-pointer needle 42 incorporated in the cross-pointer instrument 43. This instrument is ordinarily provided with an ambiguity indicator at the window 44 and a cross-pointer warning flag at the window 45. The former is for the purpose above indicated, namely, informing the pilot as to whether he is approaching or has passed the station, and the latter is for the purpose of informing the pilot whether centering of the needle is due to on-course flight or to lack of signal voltage. Galvanometer type coils 46 and 47 may be used for operating the ambiguity and warning flags respectively, the coil 46 being suitably energized through a valve similar to V₇ and generally indicated at V'₇, and phase sensitive rectifier 40' (in the same manner as the cross pointer coil 41) according to the voltage from the resolver secondary winding 35, and the coil 47 being suitably energized, as from the cathode circuit of the valve V₇, to represent either normal or cut-off conditions. The grid of valve V'₇ is biased by a voltage from the rectifier circuit at junction 23' through a circuit 50 including a resistance 50'.

For simulating the effect of beyond-range conditions, the grid 39 of valve V₇ has also impressed thereon a voltage from the rectifier system. Specifically, the grid is connected to junction 23' through a resistance 48 and conductor 49, so that in the case of a negative rectifier D. C. voltage representing a beyond-range condition, the grid is biased more negative with the result that the valve V₇ gradually cuts off until the localizer cross-pointer becomes inoperative and is finally centered. At the same time, the cross pointer warning flag, which is normally biased by its coil 47 away from the window opening 45 when the tube V₇ is conducting, now moves in front of the window to inform the pilot that the cross-pointer is centered due to the lack of signal voltage. Similarly, the ambiguity indicator, which is centered when there is no voltage on the coil 46, as where the tube V'₇ is biased to cut-off, indicates merely a blank space thereby further informing the pilot that there is no signal voltage and that he is beyond the range of the station.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. Simulated high frequency radio receiving apparatus for ground-based aircraft trainers comprising means for deriving an electrical signal representing the altitude of the aircraft during a simulated flight, means for deriving a second electrical signal representing the range or distance of the aircraft from a high frequency radio transmitter, sensing means including electronic valve circuitry responsive to the difference between the magnitudes of said electrical signals for producing an electrical control signal variable in sense and magnitude according to a predetermined relationship between altitude and distance representing the effective line-of-sight radio reception range, a signal producing system for normally operating said simulated radio receiving apparatus, and additional circuit controlling means operatively connected to said signal producing system for controlling indication of the simulated radio receiving apparatus in response to said control signal to represent a position of the simulated flight beyond the effective reception range.

2. In an aircraft training system for radio navigation having means for simulating the transmission of high frequency radio range signals and means for receiving said signals, means for deriving an A. C. voltage representing the instant altitude of the aircraft during a simulated flight, means for deriving another A. C. voltage of opposite phase representing the instant range of the aircraft from a high frequency radio transmitting station, electronic means jointly responsive to said voltages including a phase-sensitive rectifier for producing a control voltage variable in sense and magnitude according to a relationship between altitude and range representing the line-of-sight from said station with respect to the earth's surface, and electronic means responsive to said control voltage for preventing operation of said reception means according to a predetermined sense of said control voltage for representing a position of the simulated flight below said line-of-sight.

3. In an aircraft training system for radio navigation having means including both aural means and indicating instruments for simulating the transmission and reception of high frequency radio range signals, potentiometer means for deriving a voltage representing the instant altitude of the aircraft during a simulated flight, potentiometer means for deriving another voltage of opposite sense representing the instant range of the aircraft from a high frequency radio transmitting station, sensing means jointly responsive to said voltages for producing a control voltage variable in sense and magnitude according to a relationship between altitude and range representing the line-of-sight from said station with respect to the earth's surface, electronic valve means subject to said control voltage, and means controlled by said valve means for discontinuing the operation of said aural means and indicating instruments for representing a position of the simulated flight below said line-of-sight.

4. In an aircraft training system for radio navigation having means including a localizer cross-pointer instrument for simulating the transmission and reception of high frequency radio range signals, means for representing the instant altitude of the aircraft, means for representing the instant range of the aircraft from a high frequency radio transmitting station, electrical means jointly responsive to said altitude and range means for producing a control voltage variable in sense according to a relationship between altitude and range representing the line-of-sight from said station with respect to the earth's surface, and means adjustable according to a selected course with respect to said station for deriving voltages representing respectively flight deviation from said course and the ambiguity factor with respect to said station, said instrument having a cross-pointer and a cross-pointer warning flag responsive to said deviation voltage and a "to-from" indicator responsive to said ambiguity voltage, said derived voltages being subject to modification by said control voltage for discontinuing the operation of said cross-pointer, cross-pointer flag and ambiguity indicator for representing a position of the simulated flight below said line-of-sight.

5. In an aircraft training system for radio navigation having means for simulating the transmission and reception of high frequency radio range signals, a source of A. C. voltages of opposite phases, means for deriving an A. C. voltage representing the instant altitude of the aircraft during a simulated flight, means for deriving another A. C. voltage of opposite phase representing the instant range of the aircraft from a high frequency radio transmitting station, electrical summing means jointly responsive to said voltages including a phase-sensitive rectifier for producing a control voltage variable in sense and magnitude according to a relationship between altitude and range representing the line-of-sight from said station with respect to the earth's surface, means responsive to said control voltage for discontinuing the operation of said reception means according to a predetermined sense of said control voltage for representing a position of the simulated flight below said line-of-sight, and a switch controlled by an instructor for connecting one of said source voltages to said summing means for simulating unusual reception conditions.

6. In an aircraft training system for radio navigation having means including both aural means and indicating instruments for simulating the transmission and reception of high frequency radio range signals, potentiometer means for deriving a voltage representing the instant altitude of the aircraft during a simulated flight, potentiometer means for deriving another voltage of opposite sense representing the instant range of the aircraft from a high frequency radio transmitting station, sensing means jointly responsive to said voltages for producing a control voltage variable in sense and magnitude according to a relationship between altitude and range representing the line-of-sight from said station with respect to the earth's surface, and electronic valve means having a control element subject to said control voltage, said valve means thereby being adapted gradually to fade-out the operation of said aural means and indicating instruments for representing gradual lowering of the position of the simulated flight below said line-of-sight.

7. In an aircraft training system for radio navigation having means for simulating the transmission and reception of high frequency radio range signals, said means including a simulated localizer cross-pointer instrument, means for representing the instant altitude of the aircraft, means for representing the instant range of the aircraft from a high frequency radio transmitting station, electrical means jointly responsive to said altitude and range means for producing a control voltage variable in sense according to a relationship between altitude and range representing the line-of-sight from said station with respect to the earth's surface, means adjustable according to a selected course with respect to said station for deriving voltages representing respectively flight deviation from said course and the ambiguity factor with respect to said station, electronic valve means having control elements energized respectively by said derived voltages, said instrument having a cross-pointer needle and a cross-pointer warning flag both responsive to one of said valve means according to said deviation voltage and a "to-from" indicator responsive to another of said valve means according to said ambiguity voltage, said valve control elements also being energized by said control voltage for discontinuing the operation of said cross-pointer, cross-pointer flag and ambiguity indicator for representing a position of the simulated flight below said line-of-sight.

References Cited in the file of this patent

UNITED STATES PATENTS

| | | |
|---|---|---|
| 1,981,589 | Dunmore | Nov. 20, 1934 |
| 2,366,603 | Dehmel | Jan. 2, 1945 |
| 2,448,544 | Muller | Sept. 7, 1948 |
| 2,450,240 | Kail | Sept. 28, 1948 |
| 2,471,439 | Melvin et al. | May 31, 1949 |
| 2,519,233 | Davis et al. | Aug. 15, 1950 |
| 2,559,039 | Decker | July 3, 1951 |
| 2,560,527 | Dehmel | July 10, 1951 |
| 2,685,747 | Hicken | Aug. 10, 1954 |